United States Patent
Fujii (10) Patent No.: US 10,613,317 B2
(45) Date of Patent: Apr. 7, 2020

(54) PHOSPHOR WHEEL

(71) Applicant: CASIO COMPUTER CO., LTD., Tokyo (JP)

(72) Inventor: Daijiro Fujii, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/015,289

(22) Filed: Jun. 22, 2018

(65) Prior Publication Data
US 2018/0373023 A1    Dec. 27, 2018

(30) Foreign Application Priority Data

Jun. 22, 2017 (JP) .................................. 2017-122132

(51) Int. Cl.
| | | |
|---|---|---|
| G02B 26/00 | (2006.01) | |
| G02B 7/00 | (2006.01) | |
| G02B 5/02 | (2006.01) | |
| G03B 21/20 | (2006.01) | |

(52) U.S. Cl.
CPC ......... *G02B 26/008* (2013.01); *G02B 5/0278* (2013.01); *G02B 7/006* (2013.01); *G03B 21/204* (2013.01)

(58) Field of Classification Search
CPC .... G02B 26/008; G02B 5/0278; G02B 7/006; G02B 26/00; G02B 26/007; G02B 17/006;
(Continued)

(56) References Cited

U.S. PATENT DOCUMENTS 4,077,237 A *  3/1978  Loper ................. A44C 25/007
                                              63/31
5,838,860 A *  11/1998  Kingstone ........... F21S 10/005
                                              385/100
(Continued)

FOREIGN PATENT DOCUMENTS

JP    2011-070882 A    4/2011
JP    2012-008177 A    1/2012
(Continued)

OTHER PUBLICATIONS

Extended European Search Report dated Nov. 29, 2018 received in European Patent Application No. EP 18179362.1.

*Primary Examiner* — Anh T Mai
*Assistant Examiner* — Fatima N Farokhrooz
(74) *Attorney, Agent, or Firm* — Scully Scott Murphy & Presser

(57) ABSTRACT

There is provided a phosphor wheel which can reduce or prevent misalignment and clipping of a diffuser plate.

A phosphor wheel includes a wheel plate which has an opening extending from one surface to the other surface and is to be used in a rotating state, and a transmissive member which is disposed inside the opening. The transmissive member is in contact with an edge of the opening of the wheel plate at a plurality of points including two points of an outer periphery part on an outer side in a rotation radius direction of the wheel plate to be supported.

Accordingly, as compared to the case where the outer periphery part of the transmissive member is in contact with the edge of the opening at one point, the transmissive member is held more stably, and misalignment and clipping can be reduced or prevented.

5 Claims, 6 Drawing Sheets

(58) Field of Classification Search
CPC ........ G02B 27/48; G02B 1/11; G03B 21/204;
G03B 21/213; G03B 21/145; G03B
21/208; G03B 33/08; G03B 21/16; G03B
21/2066; G03B 21/142; H04N 9/3114;
H04N 9/315; H04N 9/3158; H04N
9/3161; H04N 9/3111; F21S 10/02; F21V
5/04; F21V 14/08; F21V 9/08; F21V
9/04; F21V 9/30; F21W 2131/406; C09K
11/7774
See application file for complete search history.

(56) References Cited

U.S. PATENT DOCUMENTS

| | | | |
|---|---|---|---|
| 7,942,535 B2* | 5/2011 | Kjaer | G03B 21/14 |
| | | | 348/743 |
| 9,681,110 B2 | 6/2017 | Miyazaki | |
| 2002/0012111 A1 | 1/2002 | Kitano | |
| 2008/0192372 A1 | 8/2008 | Lin et al. | |
| 2009/0273763 A1* | 11/2009 | Kjaer | G03B 21/14 |
| | | | 353/84 |
| 2010/0245776 A1* | 9/2010 | Yamamoto | G03B 21/204 |
| | | | 353/38 |
| 2016/0004138 A1 | 1/2016 | Jao et al. | |
| 2016/0073068 A1 | 3/2016 | Miyazaki | |
| 2016/0291315 A1* | 10/2016 | Hsu | G02B 26/008 |
| 2017/0237952 A1 | 8/2017 | Miyazaki | |

FOREIGN PATENT DOCUMENTS

| | | |
|---|---|---|
| JP | 2012-068528 A | 4/2012 |
| JP | 2016-057396 A | 4/2016 |

\* cited by examiner

PHOSPHOR WHEEL

CROSS-REFERENCE TO RELATED APPLICATION

This application is based upon and claims the benefit of priority from Japanese Patent Application No. 2017-122132, filed Jun. 22, 2017, the entire contents of which are incorporated herein by reference.

TECHNICAL FIELD

The present invention relates to a phosphor wheel.

BACKGROUND

An apparatus which projects lights of different colors, such as a projector, includes an excitation light source configured to emit excitation light of a single color, and a phosphor wheel having a diffuser plate configured to receive the excitation light from the excitation light source and transmit therethrough while diffusing the excitation light and a phosphor layer configured to receive the excitation light and emit fluorescence of colors different from the color of the excitation light. The apparatus causes the excitation light source to irradiate the diffuser plate and the phosphor layer of the phosphor wheel rotating with excitation light and extracts light of a plurality of colors to form images to be projected (for example, refer to JP-A-2012-068528).

The phosphor wheel of JP-A-2012-068528 includes transmissive sections formed by fitting arc-shaped phosphor layers and arc-shaped diffuser plates in the same circumferential band of a wheel plate.

The phosphor wheel having the above-described structure has a problem that when the phosphor wheel rotates at high speed, the centrifugal force may cause misalignment or separation of transmissive members such as the diffuser plates, resulting in malfunction of the phosphor wheel.

The present invention has been made in view of the above circumstances, and an object of the present invention is to provide a phosphor wheel capable of reducing or preventing misalignment and separation of transmissive members.

SUMMARY

According to an aspect of the present invention, there is provided a phosphor wheel including: a wheel plate which has an opening extending from one surface to the other surface thereof and is to be used in a rotating state; and a transmissive member which is disposed inside the opening, wherein the transmissive member is in contact with an edge of the opening of the wheel plate at a plurality of points including two points of an end part of an outer periphery of the transmissive member on an outer side in a rotation radius direction of the wheel plate to be supported.

DETAILED DESCRIPTION

Hereinafter, an embodiment of the present invention will be described with reference to the accompanying drawings. Although the embodiment to be described below has some features which are technically advantageous in implementing the present invention, those features do not limit the scope of the present invention to the following embodiment and examples shown in the drawings.

Figure 1:
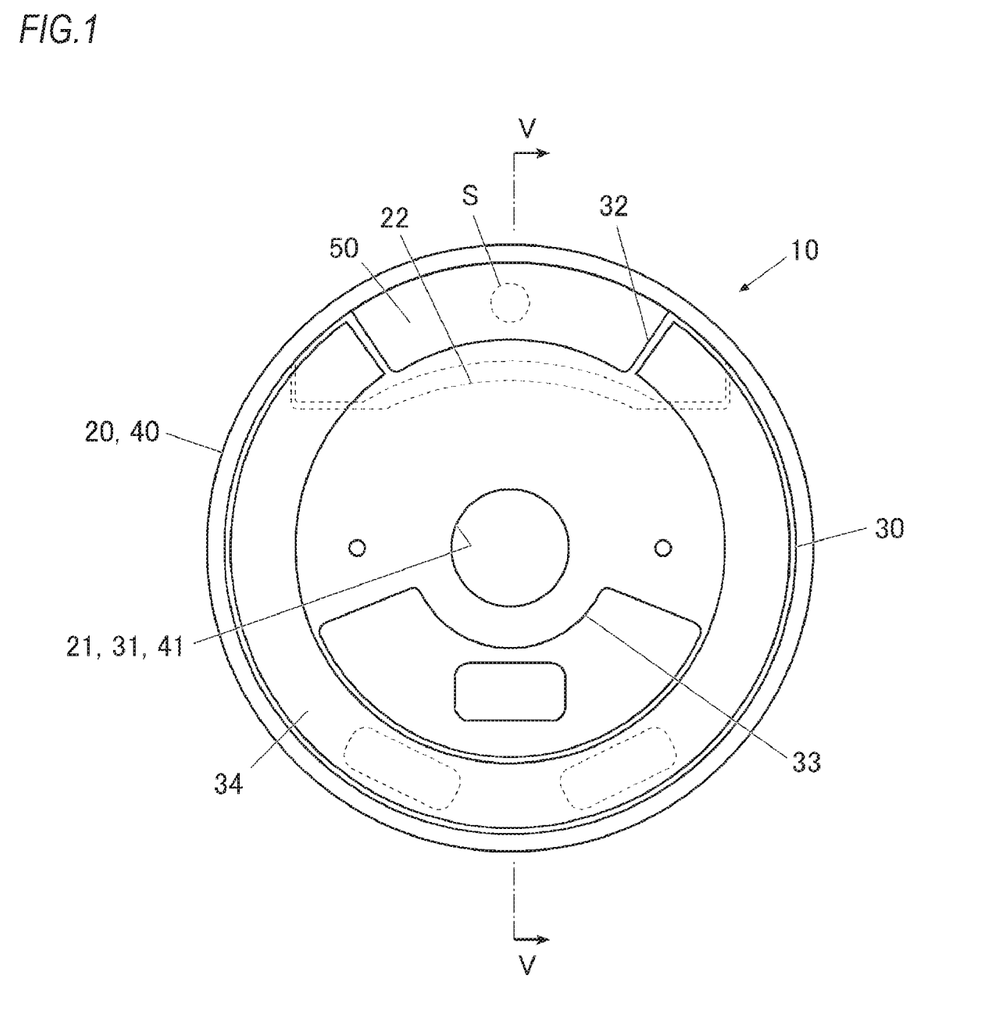
FIG. 1 is a front view illustrating a phosphor wheel according to an embodiment of the present invention.
Figure 2:
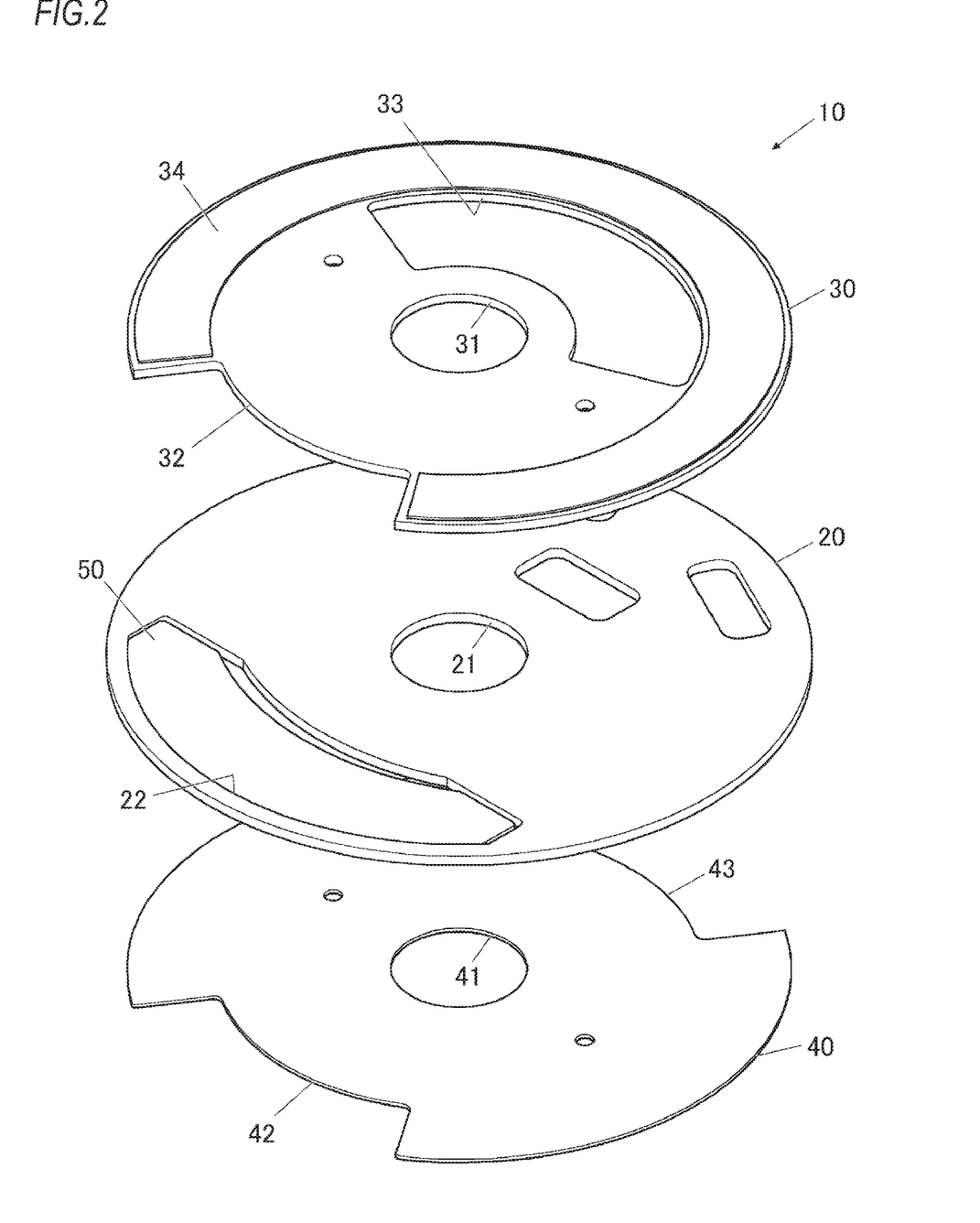
FIG. 2 is an exploded perspective view illustrating the phosphor wheel.
Figure 3:
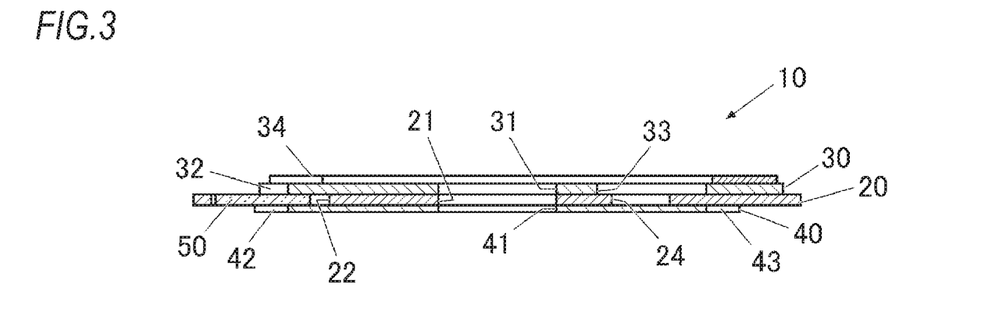
FIG. 3 is a cross-sectional view illustrating a cross section taken along a line V-V of FIG. 1 as seen in the direction of arrows.

FIG. 1 is a front view illustrating a phosphor wheel 10 which can be assembled in a light projection system of a projector, and FIG. 2 is an exploded perspective view illustrating the phosphor wheel 10, and FIG. 3 is a cross-sectional view taken along a line V-V of FIG. 1.

[Schematic Configuration of Phosphor Wheel]

The phosphor wheel 10 is configured to convert excitation light of a predetermined color (a predetermined wavelength band) emitted from a light source of a projector into light of the same color having convergence lower than that of the excitation light and convert the excitation light into light of a different color (a different wavelength band).

The phosphor wheel 10 has a disk shape and includes a rotary shaft disposed in a center hole formed at a center thereof such that the rotary shaft can be rotated by a spindle motor. Torque is applied to the phosphor wheel 10 via the rotary shaft.

The phosphor wheel 10 includes a circular wheel plate 20, a phosphor plate 30 disposed on one surface of the wheel plate 20, a holding plate 40 disposed on the other surface of the wheel plate 20, and a diffuser plate 50 disposed as a transmissive member in the wheel plate 20.

With respect to the phosphor wheel 10, the wheel plate 20, the phosphor plate 30, the holding plate 40, and the diffuser plate 50, surfaces on the front side of the drawing sheet of FIG. 1 are referred to as front surfaces, and surfaces on the opposite side to the front side are referred to as rear surfaces.

[Wheel Plate]

Figure 4:
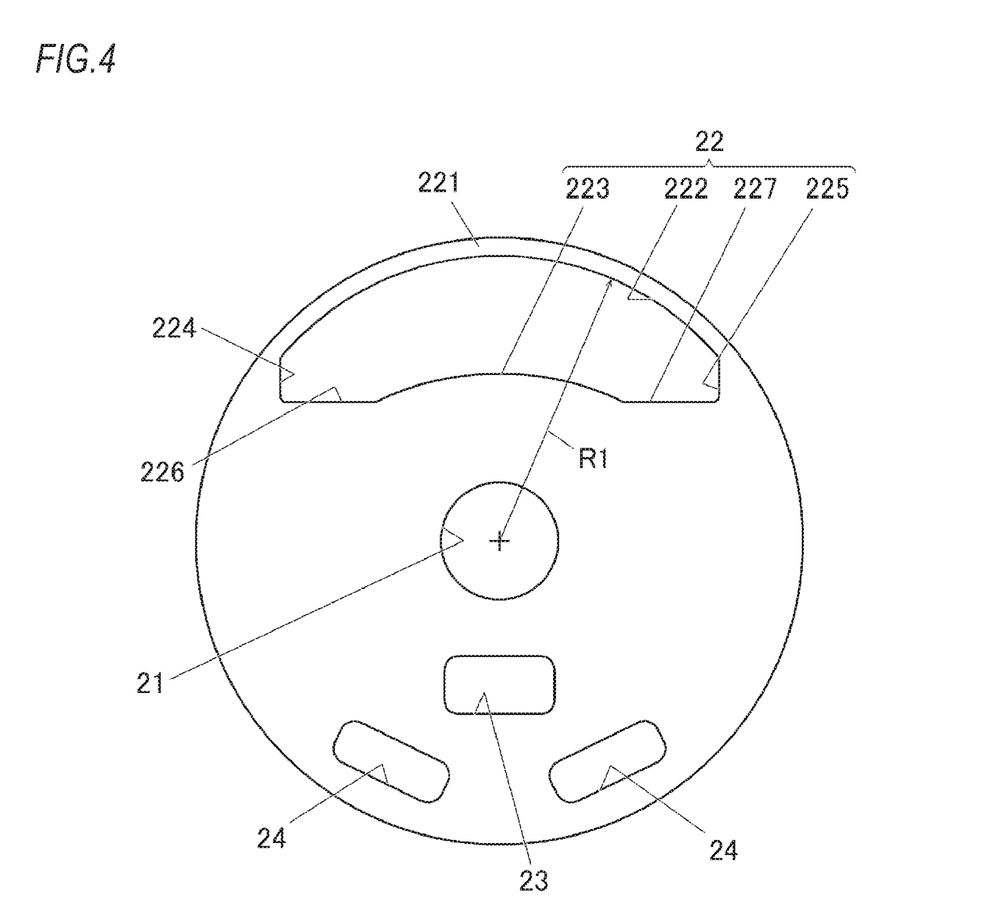
FIG. 4 is a front view illustrating a wheel plate.

FIG. 4 is a front view illustrating the wheel plate 20.

The wheel plate 20 is a circular plate formed of a metal such as copper, aluminum, or stainless steel.

The wheel plate 20 has a center hole 21 formed at a center thereof so as to extend from the front surface to the rear surface. The center hole 21 constitutes the above-mentioned center hole of the phosphor wheel 10, and the rotary shaft is inserted therein during use of the phosphor wheel 10.

The wheel plate 20 has through-holes 23, 24 formed on one side of the center hole 21 so as to extend from the front surface to the rear surface in order to achieve a weight balance. One of the through-holes 23 is also used for alignment during assembling of the phosphor wheel 10.

The wheel plate 20 has an opening 22 formed in an outer periphery side so as to extend from the front surface to the rear surface. The diffuser plate 50 is disposed inside the opening 22.

The opening 22 has a structure which closes an outer side of a rotation radius direction of the phosphor wheel 10 for the diffuser plate 50 to be disposed inside the opening and has a blocking part 221 on the outer side of the diffuser plate in the rotation radius direction.

A rotation circumference direction of the wheel plate 20 matches the rotation circumference direction of the entire phosphor wheel 10, and a rotation radius direction of the wheel plate 20 matches the rotation radius direction of the entire phosphor wheel 10. In the following description, the rotation circumference direction of the wheel plate 20 will be simply referred to as the rotation circumference direction, and the rotation radius direction of the wheel plate 20 will be simply referred to as the rotation radius direction.

In the following description, when a rotation circumference direction and a rotation radius direction are referred to with respect to the diffuser plate, they refer to the rotation circumference direction of the wheel plate 20 and the rotation radius direction of the wheel plate 20 when the diffuser plate 50 is provided in the wheel plate 20 in the state of FIG. 6A.

In the following description, when a rotation circumference direction and a rotation radius direction are referred to with respect to the phosphor plate 30 and the holding plate 40, they refer to the rotation circumference direction of the wheel plate 20 and the rotation radius direction of the wheel plate 20 in a state where the phosphor plate 30 and the holding plate 40 are concentrically assembled with the wheel plate 20.

The opening 22 has a symmetrical shape in the left-right direction of the drawing sheet of FIG. 4, and the edge of the opening includes a concave arc part 222 recessed outward in the rotation radius direction, a convex arc part 223 protruding outward in the rotation radius direction, a first straight part 224 and a second straight part 225 connected to both ends of the concave arc part 222, respectively, and a third straight part 226 and a fourth straight part 227 connected to both ends of the convex arc part 223, respectively.

The concave arc part 222 is formed along an arc having the same center as that of the wheel plate 20 and having a radius R1 slightly smaller than the outer circumference of the wheel plate 20.

The convex arc part 223 is also formed along an arc, and the radius of the convex arc part may be equal to or larger than that of the concave arc part 222, or may be smaller than that of the concave arc part. The convex arc part 223 may not have the same center as that of the wheel plate 20.

The first straight part 224 and the second straight part 225 extend along a direction perpendicular to the tangent at the center of the concave arc part 222 in the rotation circumference direction.

The third straight part 226 and the fourth straight part 227 extend along a direction parallel with the tangent at the center of the concave arc part 222 in the rotation circumference direction.

[Diffuser Plate]

Figure 5:
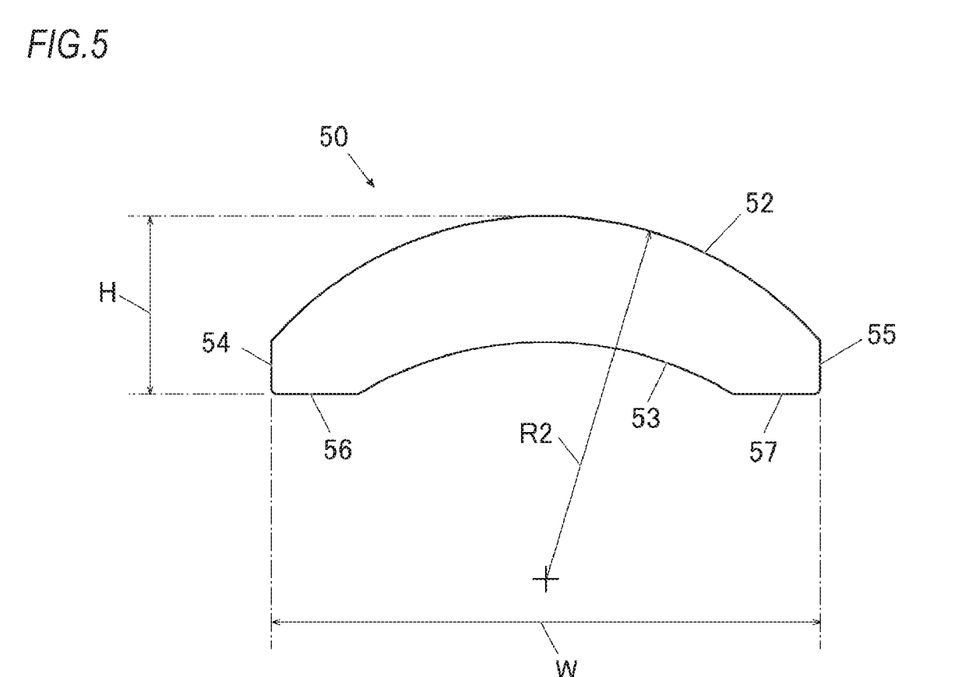
FIG. 5 is a front view illustrating a diffuser plate.

FIG. 5 is a front view illustrating the diffuser plate 50.

The diffuser plate 50 is configured to transmit excitation light therethrough while diffusing it. For example, the diffuser plate 50 is a light-transmissive plate formed of colorless and transparent glass or the like having particulates or fine pores distributed therein, or a colorless and transparent light-transmissive plate having fine irregularities on the front surface thereof. Therefore, convergence of excitation light having passed through the diffuser plate 50 is lower than that of the excitation light before passing through the diffuser plate.

Since the diffuser plate 50 is disposed inside the opening 22 of the wheel plate 20, as shown in FIG. 5, the shape of the outer edge of the diffuser plate 50 is similar to the shape of the inner edge of the opening 22. The shape and dimensions of the diffuser plate 50 are set in view of the accuracy of machining of the diffuser plate such that a gap is formed around the diffuser plate in the state where the diffuser plate is disposed in the opening 22.

The diffuser plate 50 has a symmetrical shape in the left-right direction of the drawing sheet of FIG. 5, and the outer edge of the diffuser plate includes a convex arc part 52 protruding outward in the rotation radius direction, a concave arc part 53 recessed outward in the rotation radius direction, a first straight part 54 and a second straight part 55 connected to both ends of the convex arc part 52, respectively, and a third straight part 56 and a fourth straight part 57 connected to both ends of the concave arc part 53, respectively. All corners which are the boundaries between those parts are chamfered, and thus the diffuser plate 50 is suppressed from cracking or being clipped.

The convex arc part 52 is formed along an arc having a radius R2 larger than the radius R1 of the concave arc part 222 of the opening 22 of the wheel plate 20 (R1<R2).

Figure 6A:
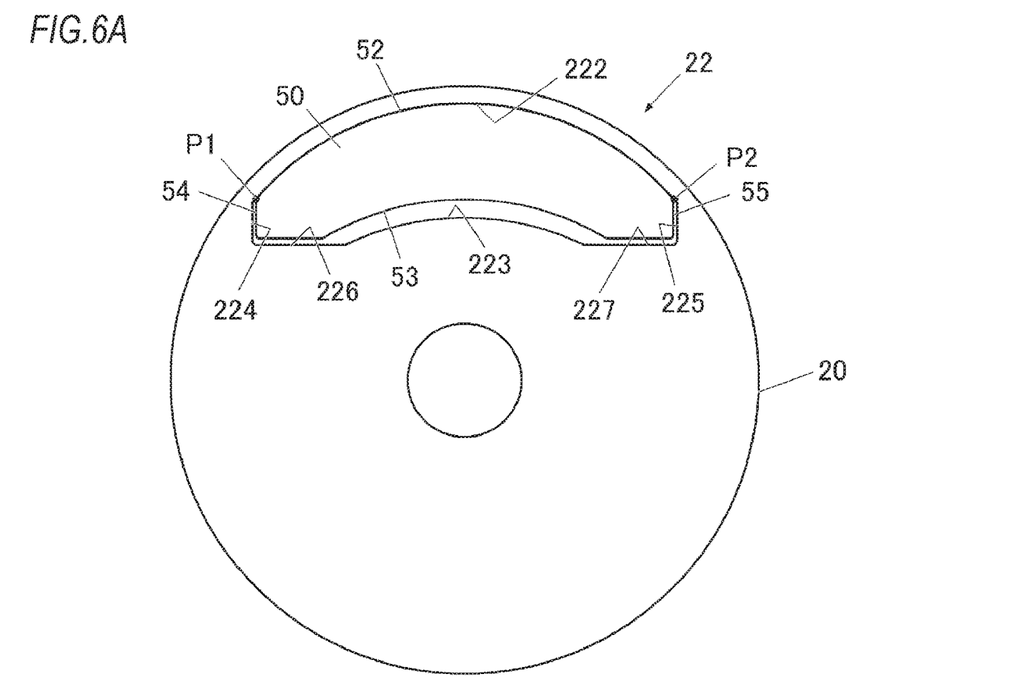
FIG. 6A is a front view illustrating the diffuser plate and the wheel plate when the diffuser plate is placed on an outer side in a radial direction without being displaced in a circumference direction.

The radius of the arc of the concave arc part 53 may be selected to be an arbitrary value as long as the convex arc part 53 is not in contact with the convex arc part 223 in the disposition state of FIG. 6A.

The first straight part 54 and the second straight part 55 extend along a direction perpendicular to the tangent at the center of the convex arc part 52 in the rotation circumference direction.

The third straight part 56 and the fourth straight part 57 extend along the direction of the tangent at the center of the convex arc part 52 in the rotation circumference direction.

The width W of the diffuser plate 50 in a direction parallel with the tangent at the center of the convex arc part 52 in the rotation circumference direction is slightly narrower than the width of the opening 22 in the same direction in the disposition state of FIG. 6A.

The width H of the diffuser plate 50 in a direction perpendicular to the tangent at the center of the convex arc part 52 in the rotation circumference direction is slightly narrower than the width of the opening 22 in the same direction in the disposition state of FIG. 6A.

Therefore, in the case where the convex arc part 52 of the diffuser plate 50 is displaced toward the concave arc part 222 inside the opening 22 as shown in FIG. 6A, the outer circumference of the diffuser plate 50 comes into contact with the concave arc part 222 at two points P1, P2 of both ends of the convex arc part 52.

In a direction perpendicular to the wheel plate 20, the diffuser plate 50 is held from both sides by the phosphor plate 30 and the holding plate 40.

Since the phosphor wheel 10 is used in a high-speed rotation state, the centrifugal force acts on the diffuser plate 50 in the opening 22 of the wheel plate 20 in such a direction that the convex arc part 52 is displaced toward the concave arc part 222 of the opening 22.

Therefore, if the diffuser plate 50 is disposed inside the opening 22 so as to come into contact with the concave arc part 222 at the two points P1, P2 of both ends of the convex arc part 52, the position of the diffuser plate 50 can be kept more stably as compared to a state where the diffuser plate is in contact with the concave arc part 222 at one point.

Figure 6B:
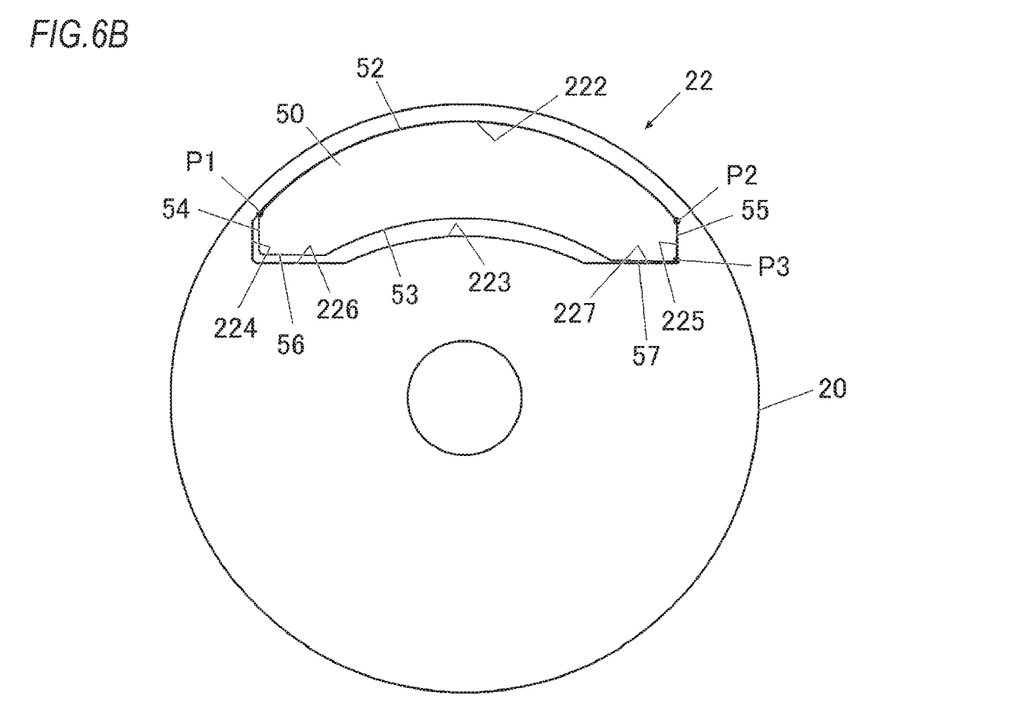
FIG. 6B is a front view illustrating the diffuser plate and the wheel plate when the diffuser plate is placed on the outer side in the radial direction and is displaced in the circumference direction.

The opening 22 of the wheel plate 20 has room where the diffuser plate 50 can be displaced in the rotation circumference direction. FIG. 6B shows a state where the diffuser plate 50 is displaced toward one side in the rotation circumference direction inside the opening 22.

Even in this case, the diffuser plate 50 is in contact with the concave arc part 222 at the two points P1, P2 of both ends of the convex arc part 52 and a point P3 which is the border between the second straight part 55 and the fourth straight part 57. Therefore, the position of the diffuser plate 50 can be kept more stable as compared to a state where the diffuser plate is in contact with the concave arc part 222 at one point.

Although FIG. 6B shows the case where the diffuser plate 50 is biased toward the right side of the drawing sheet, even in the case where the diffuser plate is biased toward the left side of the drawing sheet, the same effect is obtained.

As described above, the diffuser plate 50 is held from both sides by the phosphor plate 30 and the holding plate 40. However, the diffuser plate 50 may be fixed by bonding a part of the surfaces of the diffuser plate 50 to one or both of the phosphor plate 30 and the holding plate 40.

During bonding, it is advantageous to dispose the diffuser plate 50 inside the opening 22 such that the diffuser plate 50 is in contact with the edge of the opening 22 at two or more points as shown in FIG. 6A or FIG. 6B. In this case, even though the centrifugal force acts on the diffuser plate 50 during rotation, the adhesive is unlikely to peel off, and the amount of adhesive can be reduced.

Further, in this case, since the size of the bonding area where the diffuser plate 50 overlaps the phosphor plate 30 or the holding plate 40 can be reduced, it is possible to secure a large area of the diffuser plate 50 as an area where excitation light can enter.

[Holding Plate]

As shown in FIG. 1 to FIG. 3, the holding plate 40 is fixed to the rear surface of the wheel plate 20 by bonding.

The holding plate 40 is a circular plate formed of a metal such as copper, aluminum, or stainless steel, and has an outside diameter approximately equal to that of the wheel plate 20.

The holding plate 40 has a center hole 41 formed at the center so as to extend from the front surface to the rear surface. The center hole 41 constitutes the above-mentioned center hole of the phosphor wheel 10, and the rotary shaft is inserted therein during use of the phosphor wheel 10. The center hole 41 of the holding plate 40 has the same diameter as that of the center hole 21 of the wheel plate 20, and the holding plate 40 and the wheel plate 20 are bonded so as to be concentric.

Both end parts of the holding plate 40 in a diameter direction of the holding plate 40 passing through the center of the center hole 41 have arc-shaped cutouts 42, 43, respectively.

Both of the cutouts 42, 43 are formed with a predetermined width in the rotation radius direction from the outer circumference of the holding plate 40 toward the center in a predetermined angle range in the rotation circumference direction. Since the cutouts 42, 43 are the same as each other in the formation width and the formation angle range, a weight balance during rotation is achieved.

The holding plate 40 and the wheel plate 20 are assembled with each other such that one cutout 42 and the opening 22 of the wheel plate 20 overlap as seen from the direction of the center axis.

The angle range of the cutout 42 in the rotation circumference direction is narrower than the angle range of the opening 22 in the rotation circumference direction.

In a state where the holding plate 40 and the wheel plate 20 are assembled, due to the cutout 42, the holding plate 40 blocks both end parts of the opening 22 in the rotation circumference direction and does not block the center part of the opening 22 in the rotation circumference direction, as seen from the direction of the center axis.

Therefore, when the diffuser plate 50 is disposed inside the opening 22, both outer parts of the cutout 42 of the holding plate 40 in the rotation circumference direction which block both end parts of the opening 22 in the rotation circumference direction support both end parts of the diffuser plate 50 in the rotation circumference direction from the rear surface side.

Both outer parts of the cutout 42 of the holding plate 40 in the rotation circumference direction and both end parts of the diffuser plate 50 in the rotation circumference direction may be bonded with an adhesive.

[Phosphor Plate]

As shown in FIG. 1 to FIG. 3, the phosphor plate 30 is fixed to the front surface of the wheel plate 20 by bonding.

The phosphor plate 30 is a circular plate formed of a metal such as copper, aluminum, or stainless steel, and has an outside diameter slightly smaller than that of the wheel plate 20. The front surface of the phosphor plate 30 is a reflective surface produced by mirror finishing such as mirror polishing or silver deposition.

The phosphor plate 30 has a center hole 31 formed at the center thereof so as to extend from the front surface to the rear surface. The center hole 31 constitutes the above-mentioned center hole of the phosphor wheel 10, and the rotary shaft is inserted therein during use of the phosphor wheel 10. The center hole 31 of the phosphor plate 30 has the same diameter as that of the center hole 21 of the wheel plate 20, and the phosphor plate 30 and the wheel plate 20 are bonded so as to be concentric.

The outer periphery of the phosphor plate 30 has an arc-shaped cutout 32. The cutout 32 is formed with a predetermined width in the rotation radius direction from the outer circumference of the phosphor plate 30 toward the center, in a predetermined angle range in the rotation circumference direction.

The opposite side of the center hole 31 to the cutout 32 has an arc-shaped through-hole 33 formed closer to the center hole 31 than the cutout 32 is, so as to extend from the front surface to the rear surface. The through-hole 33 is formed to achieve a weight balance with respect to the cutout 32 during rotation.

The phosphor plate 30 and the wheel plate 20 are assembled with each other such that the cutout 32 and the opening 22 of the wheel plate 20 overlap as seen from the direction of the center axis.

Further, the angle range of the cutout 32 in the rotation circumference direction is slightly smaller than the angle range of the opening 22 in the rotation circumference direction. The cutout 32 of the phosphor plate 30 has a width in the rotation radius direction and an angle range in the rotation circumference direction approximately equal to those of the cutout 42 of the holding plate 40.

Therefore, in a state where the phosphor plate 30 and the wheel plate 20 have been assembled, due to the cutout 32, the phosphor plate 30 blocks both end parts of the opening 22 in the rotation circumference direction and does not block the center part of the opening 22 in the rotation circumference direction, as seen from the direction of the center axis.

Therefore, when the diffuser plate 50 is inside the opening 22, both outer parts of the cutout 32 of the phosphor plate 30 in the rotation circumference direction which block both end parts of the opening in the rotation circumference direction support both end parts of the diffuser plate in the rotation circumference direction, from the front surface side.

Both outer parts of the cutout 32 of the phosphor plate 30 in the rotation circumference direction and both end parts of the diffuser plate 50 in the rotation circumference direction may be bonded with an adhesive.

The phosphor plate 30 has an arc-band-shaped phosphor layer 34 formed on the outer periphery of the front surface over an angle range in the rotation circumference direction except for the cutout 32. The phosphor layer 34 is formed on a circumferential zone which is almost the same as a circumferential zone where the cutout 32 is formed, as seen from the direction of the center line of rotation.

The phosphor layer 34 is a layer formed by dispersing a phosphor in a transmissive binder (such as a ceramic binder, a resin binder, or a silicon binder).

The phosphor layer 34 may be formed inside an arc-band-shaped recess formed in the front surface of the phosphor plate 30 over the formation range of the phosphor layer 34. In this case, mirror finishing may be necessary on the bottom of the recess.

If excitation light of the predetermined color (the predetermined wavelength band) emitted from the light source enters the phosphor layer 34, the phosphor layer 34 is excited by the excitation light to emit fluorescence of a color different from that of the excitation light. Although the wavelength band of the excitation light is not particularly limited, it is advantageous that the excitation light is visible light of a single color. As long as the color of fluorescence which is emitted from the phosphor layer 34 is different from the color of the excitation light, the wavelength band of the fluorescence is not particularly limited. However, it is advantageous to select a phosphor capable of emitting visible light of a single color. For example, the color of the excitation light is any one color of the three primary colors of light, and a phosphor is selected such that the color of fluorescence which is emitted from the phosphor layer 34 is another color of the three primary colors of light. For example, in the case where the excitation light is light of the wavelength band of blue, a phosphor may be selected such that fluorescence which is emitted from the phosphor layer 34 is light of the wavelength band of green.

Although the phosphor layer 34 is formed over the circumferential zone expect for the cutout 32, it may be formed in a partial range of the circumferential zone except for the cutout 32.

In this case, it is advantageous to form an antireflection layer on the front surface of the phosphor plate 30 over the circumferential zone except for the cutout 32 and the phosphor layer 34.

Figure 7:
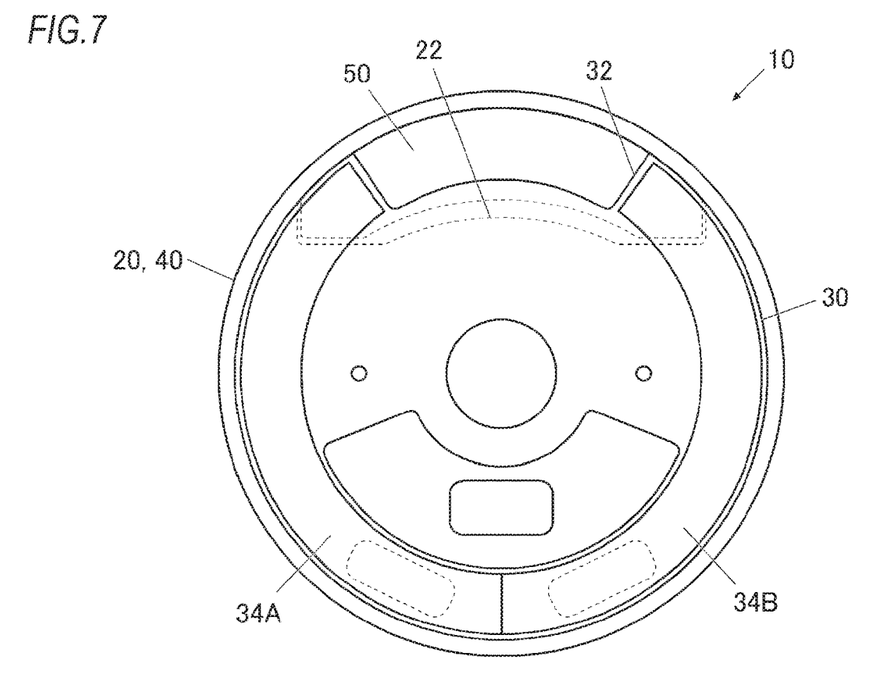
FIG. 7 is a front view illustrating a phosphor wheel having two kinds of phosphor layers.

As shown in FIG. 7, the phosphor layer 34 may be divided into two phosphor layers 34A, 34B in the rotation circumference direction, and phosphors may be selected such that the color of fluorescence of the first phosphor layer 34A is different from the color of fluorescence of the second phosphor layer 34B. As seen from the direction of the center line of rotation, the first phosphor layer 34A and the second phosphor layer 34B are arranged on the same circumferential zone having the center line of rotation as the center and are arranged so as not to overlap each other in the rotation circumference direction. If the color of fluorescence which is emitted from each of the phosphor layers 34A, 34B is different from the color of the excitation light, the wavelength band of the fluorescence is not particularly limited. However, it is advantageous that the fluorescence is visible light of a single color.

For example, the color of the excitation light, the color of fluorescence which is emitted from the first phosphor layer 34A, and the color of fluorescence which is emitted from the second phosphor layer 34B are the three primary colors of light, and phosphors different from each other are selected. For example, in the case where the excitation light is light of the wavelength band of blue, for the first phosphor layer 34A, a phosphor may be selected such that fluorescence which is emitted is light of the wavelength band of green, and for the second phosphor layer 34B, a phosphor may be selected such that fluorescence which is emitted is light of the wavelength band of red.

Figure 8:
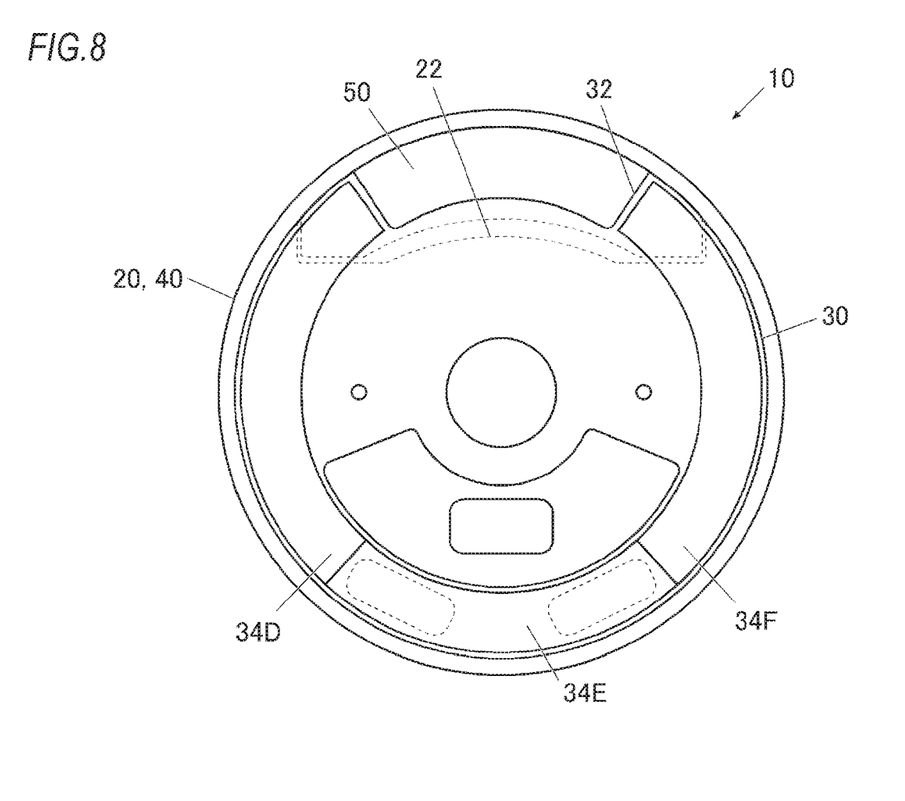
FIG. 8 is a front view illustrating a phosphor wheel having three kinds of phosphor layers.

As shown in FIG. 8, the phosphor layer 34 may be divided into three or more phosphor layers in the rotation circumference direction (FIG. 8 shows an example of the case where the phosphor layer 34 may be divided into three phosphor layers). In this case, for phosphor layers 34D to 34F, phosphors different from one another in the colors of fluorescence may be selected. Even in this case, as seen from the direction of the center line of rotation, the phosphor layers 34D to 34F are arranged on the same circumferential zone having the center line of rotation as the center, so as not to overlap one another in the rotation circumference direction. Although the wavelength of fluorescence which is emitted from each of the phosphor layers 34D to 34F is not particularly limited, it is advantageous that the fluorescence is visible light of a single color different from the color of the excitation light.

[Assembling of Phosphor Wheel]

Assembling of the phosphor wheel 10 will be described.

First, in a state where the phosphor plate 30 is placed such that the rear surface faces upward, the wheel plate 20 with the rear surface facing upward is overlapped such that the phosphor plate and the wheel plate are concentric and the opening 22 and the cutout 32 are placed at appropriate positions in the rotation circumference direction, and the rear surface of the phosphor plate 30 and the front surface of the wheel plate 20 are bonded.

Subsequently, inside the opening 22 of the wheel plate 20, the diffuser plate 50 with the rear surface facing upward is disposed. At this time, the diffuser plate is disposed such that the convex arc part 52 of the diffuser plate 50 is biased toward the concave arc part 222 of the opening 22 and the convex arc part 52 comes into contact with the concave arc part 222 at the two points P1, P2 of both end parts of the convex arc part 52 (see FIG. 6A). If necessary, both end parts of the front surface of the diffuser plate 50 in the circumference direction and both end parts of the rear surface of the phosphor plate 30 in the circumference direction are bonded.

Subsequently, on the wheel plate 20 with the rear surface facing upward, the holding plate 40 with the rear surface facing upward is overlapped such that the holding plate and the wheel plate are concentric and the cutout 42 and the opening 22 are placed at appropriate positions in the circumference direction, and the rear surface of the wheel plate 20 and the front surface of the holding plate 40 are bonded.

If necessary, both end parts of the rear surface of the diffuser plate 50 in the circumference direction and both end parts of the cutout 42 of the front surface of the holding plate 40 are bonded.

In this manner, assembling of the phosphor wheel 10 is performed.

Although the case where the phosphor plate 30, the wheel plate 20, and the holding plate 40 with the rear surfaces facing upward are stacked in the order of the phosphor plate 30, the wheel plate 20, and the holding plate 40 has been described as an example, assembling is not limited thereto.

For example, the phosphor plate 30, the wheel plate 20, and the holding plate 40 with the front surfaces facing upward may be stacked and be assembled in the order of the holding plate 40, the wheel plate 20, and the phosphor plate 30.

[Operation of Phosphor Wheel During Use]

The operation of the phosphor wheel 10 during use will be described. During use of the phosphor wheel 10, as described above, the rotary shaft is fixed in the center hole and is rotated by the spindle motor. The excitation light is radiated onto a predetermined irradiation position S (see FIG. 1) of the phosphor wheel 10 which is rotating along an optical axis along a direction perpendicular to the front surface of the phosphor plate 30. The irradiation position is in the band-shaped circumferential zone including the phosphor layer 34.

If the excitation light passes through the cutout 32 of the phosphor plate 30 during rotation of the phosphor wheel 10, the excitation light enters the diffuser plate 50 and passes through the diffuser plate 50 while diffusing. Therefore, the excitation light is converted into transmitted light having convergence and directivity lower than those of the excitation light by the diffuser plate 50. The optical axis of the transmitted light (the optical axis of the transmitted light is a virtual line extending from the diffuser plate 50 in a direction in which the light intensity is maximum) is an extension of the optical axis of the excitation light. In this case, the color of the transmitted light is the same as the color of the excitation light (for example, blue).

If the excitation light enters the phosphor layer 34 during rotation of the phosphor wheel 10, the phosphor layer 34 is excited by the excitation light and fluorescence of a color different from that of the excitation light is emitted from the phosphor layer 34 (for example, green). Even though a part of the excitation light has passed through the phosphor layer 34, the excitation light having passed through the phosphor layer is reflected by the front surface of the phosphor plate 30, and the reflected light excites the phosphor layer 34, and the phosphor layer 34 emits fluorescence. Therefore, the excitation light is converted into fluorescence of a color different from that of the excitation light by the phosphor layer 34. The fluorescence which is emitted from the phosphor layer 34 is diffused light having low convergence and low directivity, and the optical axis of the fluorescence (the optical axis of the fluorescence is a virtual line extending from the phosphor layer 34 in a direction in which the light intensity is maximum) is perpendicular to the phosphor wheel 10 and the direction thereof is opposite to the direction of the optical axis of the excitation light.

As described above, the excitation light enters each of the phosphor layer 34 and the diffuser plate 50 of the phosphor wheel 10 rotating, and thus it is possible to extract fluorescence of a different color.

[Technical Effects of Embodiment of Invention]

In the phosphor wheel 10, since the outer periphery of the diffuser plate 50 on the outer side in the rotation radius direction is in contact with the edge of the opening 22 of the wheel plate 20 at the two points or a plurality of points including them to be supported, as compared to the case where the diffuser plate is in contact with the edge of the opening at one point, the position of the diffuser plate 50 can be kept more stably, and it is possible to effectively suppress occurrence of misalignment or clipping of the diffuser plate 50 during high-speed rotation of the phosphor wheel 10.

Since it is possible to reduce occurrence of misalignment or clipping of the diffuser plate 50, even in the case of fixing the diffuser plate 50 by bonding or the like, it is possible to reduce the amount of adhesive. In this case, it is possible to reduce the transmitted light of the diffuser plate 50 from being affected by the adhesive, and thus it becomes possible to obtain appropriate transmitted light. Further, since the reduction in the amount of adhesive allows to reduce the size of the bonding area where the diffuser plate 50 overlaps the phosphor plate 30 or the holding plate 40, it is possible to secure a large area of the diffuser plate 50 as an area where excitation light can enter.

Since the opening 22 of the wheel plate 20 has the blocking part 221 on the outer side for the diffuser plate 50 in the rotation radius direction, it is possible to more effectively reduce occurrence of misalignment and clipping of the diffuser plate 50.

Further, since the opening has the blocking part 221 on the outer side for the diffuser plate 50, it is possible to protect the diffuser plate 50 from the outside and reduce occurrence of misalignment and clipping of the diffuser plate.

The edge of the opening 22 of the wheel plate 20 has the arc-shaped concave arc part 222 on the outer side for the diffuser plate 50 in the rotation radius direction of the wheel plate 20, and the edge of the diffuser plate 50 has the arc-shaped convex arc part 52 on the outer side in the rotation radius direction of the wheel plate 20, and the convex arc part 52 of the diffuser plate 50 has an arc shape having a diameter larger than that of the concave arc part 222 of the opening 22.

The case of performing machining such that the outer diameter of one of the concave arc part 222 and the convex arc part 52 facing each other is larger as described above is easier than the case of performing machining such that the outer diameter of the concave arc part 222 is the same as the outer diameter of the convex arc part 52.

Therefore, it is possible to obtain the structure in which the outer circumference of the diffuser plate 50 is in contact with the edge of the opening 22 of the wheel plate 20 by easy machining, and thus it is possible to make it easier to manufacture the phosphor wheel 10.

Since the diameter of the convex arc part 52 of the diffuser plate 50 is larger than the diameter of the concave arc part 222 of the opening 22, it is possible to reduce the width H of the convex arc part 52 in the direction perpendicular to the tangent at the center in the circumference direction, and thus it is possible to obtain more diffuser plates from a diffuser plate formation material. Therefore, it becomes possible to reduce the manufacturing cost.

Further, since the phosphor wheel 10 has the phosphor layer 34 formed on the phosphor plate 30 disposed on the front surface of the wheel plate 20, if the excitation light enters the front surface side of the phosphor wheel 10, it is possible to obtain fluorescence of a different color.

[Others]

The inventive concept of present invention can be applied to other embodiments without being limited to the above-described embodiment and can be appropriately modified without departing from the scope of the present invention.

For example, the color of the excitation light and the color of the fluorescence which is emitted from the phosphor layer 34 are examples and may be other colors. For example, it is advantageous that the color of the excitation light and the color of the fluorescence which is emitted from the phosphor layer 34 are different colors of the three primary colors of light.

Similarly, the color of the excitation light, the color of the fluorescence which is emitted from the first phosphor layer 34A, and the color of the fluorescence which is emitted from the second phosphor layer 34B may also be other colors. For example, it is advantageous that the color of the excitation light, the color of the fluorescence which is emitted from the first phosphor layer 34A, and the color of the fluorescence which is emitted from the second phosphor layer 34B are the three primary colors of light and are different from each other.

Also, in the above-described embodiment, as an example of the transmissive member, the diffuser plate 50 for transmitting while diffusing the excitation light has been taken; however, even in the case where a transmissive member formed of a transmissive material having no diffusing function, such as glass, is used in a phosphor wheel, the shape, the structural features, and the features of the surrounding support structure described in the embodiment can be applied.

Although the embodiment of the present invention has been described, the present invention is not limited to the above-described embodiment, and contains the scope of inventions disclosed in claims and the scope of their equivalents.

The invention claimed is:

1. A phosphor wheel comprising:
   a wheel plate comprising a first major surface, a second major surface opposite of the first major surface, and an edge,
     wherein the edge is a closed surface and defines an opening extending from the first major surface to the second major surface,
     wherein the wheel plate is configured to rotate about a center of the wheel plate; and
     wherein a concave arc part of the edge in a radial direction of the wheel plate has a first arc shape; and
   a transmissive member disposed in the opening of the wheel plate,
     wherein a convex outer edge part of the transmissive member has a second arc shape,
     wherein the second arc shape of the convex outer edge part of the transmissive member has a diameter larger than a diameter of the first arc shape of the concave arc part of the edge, and
     wherein the transmissive member is configured to be displaced in a radial direction from the center of the wheel plate by a centrifugal force during rotation of the wheel plate such that a plurality of discrete points including two end points of a convex outer edge part of the transmissive member contact the edge defining the opening of the wheel plate.

2. The phosphor wheel according to claim 1,
   wherein the wheel plate comprises a blocking part comprising a portion of the edge defining the opening, and
   wherein the blocking part is configured to block further displacement of the transmissive member in the radial direction by the centrifugal force during the rotation of the wheel plate.

3. The phosphor wheel according to claim 1, further comprising:
   a phosphor plate disposed on the first major surface of the wheel plate,
   wherein the phosphor plate comprises a phosphor layer, and
   wherein the phosphor layer is configured to be irradiated by excitation light and to thereby be excited by the excitation light to emit fluorescence of a color different from a color of the excitation light.

4. The phosphor wheel according to claim 1,
   wherein the transmissive member comprises:
     a diffuser plate configured to diffuse excitation light emitted from a light source; or
     a glass plate configured to transmit the excitation light.

5. A projector comprising:
   a light source; and
   the phosphor wheel according to claim 1.

* * * * *